(12) United States Patent
Hipple

(10) Patent No.: US 12,490,716 B2
(45) Date of Patent: Dec. 9, 2025

(54) PET RESTRAINT DEVICE

(71) Applicant: Clement Robert Hipple, Philadelphia, PA (US)

(72) Inventor: Clement Robert Hipple, Philadelphia, PA (US)

(*) Notice: Subject to any disclaimer, the term of this patent is extended or adjusted under 35 U.S.C. 154(b) by 0 days.

(21) Appl. No.: 18/770,389

(22) Filed: Jul. 11, 2024

(65) Prior Publication Data

US 2025/0134068 A1 May 1, 2025

Related U.S. Application Data

(63) Continuation-in-part of application No. 29/915,492, filed on Nov. 6, 2023.

(60) Provisional application No. 63/593,077, filed on Oct. 25, 2023.

(51) Int. Cl.
*A01K 15/00* (2006.01)
*A61D 3/00* (2006.01)

(52) U.S. Cl.
CPC .............. *A01K 15/003* (2013.01); *A61D 3/00* (2013.01)

(58) Field of Classification Search
CPC ...... A01K 15/003; A01K 15/04; A61G 1/044; A61D 2003/003
USPC ........................................................ 119/857
See application file for complete search history.

(56) References Cited

U.S. PATENT DOCUMENTS

| 2,033,779 A | * | 3/1936 | Monk ............... | A61G 1/044 5/628 |
| 2,377,940 A | * | 6/1945 | Hughes ............. | A61G 1/013 5/628 |
| 2,511,061 A | * | 6/1950 | Hughes ............. | A61G 1/044 5/628 |
| 3,158,875 A | * | 12/1964 | Fletcher ........... | A61G 1/01 5/628 |
| 3,286,694 A | | 11/1966 | Landy | |

(Continued)

FOREIGN PATENT DOCUMENTS

CN 114176827 A 3/2022

OTHER PUBLICATIONS

Lomir, Restraint Frames & Covers for Dogs, retrieved from Internet, retrieved on Oct. 31, 2023, <URL: https://www.lomir.com/product/restraint-frame-and-cover-dog/>.

(Continued)

*Primary Examiner* — Monica L Perry
*Assistant Examiner* — Brittany A Lowery

(57) ABSTRACT

A pet restraint device is a device that allows the user to safely and comfortably restrain a pet so that the user can perform the necessary pet care without aid from another person. The device includes a support base, a proximal restraining strap, a distal restraining strap, and an intermediate restraining strap. The support base provides a sturdy structure that accommodates the pet and where the proximal restraining strap, the intermediate restraining strap, and the distal restraining strap can be securely attached to. The proximal restraining strap, the intermediate restraining strap, and the distal restraining strap enable the user to restrain the pet to the support base in a safe manner without covering the pet's body so that the user can have easier access to the pet's body. The proximal restraining strap, the intermediate restraining strap, and the distal restraining strap can be adjusted to match the pet's body.

10 Claims, 24 Drawing Sheets

(56) References Cited

U.S. PATENT DOCUMENTS

| | | | |
|---|---|---|---|
| 4,693,212 A | 9/1987 | Black | |
| 4,852,587 A * | 8/1989 | Share | A61F 5/37 |
| | | | D29/100 |
| 4,911,106 A * | 3/1990 | Goodwin | A61D 3/00 |
| | | | 128/870 |
| 5,009,196 A * | 4/1991 | Young | A61D 3/00 |
| | | | 119/728 |
| 5,048,134 A * | 9/1991 | Dennill | A61G 1/01 |
| | | | 128/870 |
| 6,067,678 A * | 5/2000 | Trevino | A61G 7/065 |
| | | | 5/733 |
| 6,230,662 B1 * | 5/2001 | Miale | A61D 3/00 |
| | | | 119/727 |
| 6,363,936 B1 * | 4/2002 | McCormick | A61G 1/044 |
| | | | 5/624 |
| 7,938,121 B2 * | 5/2011 | McKnight | A61G 13/123 |
| | | | 128/845 |
| 8,881,327 B2 * | 11/2014 | Kenalty | A61G 1/00 |
| | | | 5/628 |
| 9,237,963 B2 * | 1/2016 | Carrier | A61G 1/044 |
| 2009/0288255 A1 * | 11/2009 | Sakurai | A61G 1/01 |
| | | | 5/706 |
| 2013/0227791 A1 * | 9/2013 | Kostron | A61G 1/04 |
| | | | 5/629 |
| 2014/0053335 A1 * | 2/2014 | Calkin | A61G 1/044 |
| | | | 5/628 |
| 2018/0177649 A1 * | 6/2018 | Kenalty | A61G 1/013 |
| 2021/0106473 A1 * | 4/2021 | Calkin | B63C 9/135 |
| 2024/0082078 A1 * | 3/2024 | Calkin | A61G 1/048 |

OTHER PUBLICATIONS

Cherrybrook, Show Dog, Grooming and Pet Supplies, retrieved on Oct. 31, 2023, <URL: https://www.pinterest.com/pin/90001692530317126/>.

* cited by examiner

PET RESTRAINT DEVICE

FIELD OF THE INVENTION

The present invention relates generally to pet accessories and veterinary supplies. More specifically, the present invention provides a pet restraint device that can safely accommodate various pets of different sizes.

BACKGROUND OF THE INVENTION

Pet care can be an arduous task for pet owners and caregivers. For example, trying to keep a restless pet still while administering medication can be difficult for a single person. These situations often force two or more people to participate so one person can hold the pet down while the other person performs the task. To help maintain the pet temporarily restrained, various pet accessories and devices have been made available that eliminate the need for another person. For example, pet restraints have been made available to keep the pet still, such as for pet grooming purposes, that enables the pet grooming to be performed by a single person. However, these pet restraints can be uncomfortable for both the pet and the user. In addition, the available pet restraints can even obstruct the user when performing the desired pet care. Therefore, there is a need for a better pet restraint device that securely and comfortably restraints a pet of any size without drastically obstructing the pet's body.

An objective of the present invention is to provide a pet restraint device that can be used by veterinarians and pet owners to securely restraint pets in different positions without harming the pet. The present invention enables the pet to be restrained in any position including, but not limited to, on their back, stomach, or side, without obstructing the pet's body. Another objective of the present invention is to provide a pet restraint device that can accommodate pets of different sizes. The present invention allows for pets of different sizes to be restrained by the user to perform the desired pet care. Another objective of the present invention is to provide a pet restraint device that can be easily set up by the user without the use of external tools. The present invention includes various strap fasteners that can be selectively engaged to comfortably retain the pet's body without the use of additional external tools. The strap fasteners can be arranged to provide lateral support to the pet's body as well as to prevent the pet from coming loose. Additional features and benefits of the present invention are further discussed in the sections below.

SUMMARY OF THE INVENTION

The present invention discloses a pet restraint device. The pet restraint device can be used to restrain a pet so that the user can safely perform different pet care tasks on the pet without harming the pet. For example, the present invention can be used to administer some type of medication to the pet. The present invention also helps the user to safely perform various grooming tasks such as trimming the pet's nails. For veterinarians, the present invention allows the veterinarians to take control of the animal and restrain the animal without the assistance of another person. This way, the veterinarian can provide the animal with injections, take the body temperature, administer medication, take blood samples, perform medical examinations, etc. In general, the present invention may include a support base and several restraining straps.

The support base provides support to the pet when restrained by the present invention. The restraining straps safely and comfortably restrains the pet to the support base. The restraining straps can be adjusted to accommodate the size of the pet without largely obstructing the pet's body. In addition, the restraining straps can be secured to the support base in different ways that allow the pet to be comfortably secured to the support base. In some embodiments, the restraining straps can be fixed to the bottom of the support base permanently. In another embodiment, the restraining straps can be removably attached to the support base with fasteners so that only the necessary straps are attached to the support base. Further, in another embodiment, the support base can include hooks that allow the restraining straps to be securely attached without the use of fasteners. Furthermore, the present invention may include restraining bands to prevent the pet from coming loose. For example, front and rear bands can be provided that prevent the pet from getting loose while the pet is restrained by the present invention. The front and rear bands can be fastened around the pet's chest and the pet's rear, respectively, so that the pet cannot escape while being restrained and the user is performing pet care. In other embodiments, additional restraining features can be provided to further restrain the pet in a safe and comfortable manner.

DETAIL DESCRIPTIONS OF THE INVENTION

All illustrations of the drawings are for the purpose of describing selected versions of the present invention and are not intended to limit the scope of the present invention.

Figure 1:
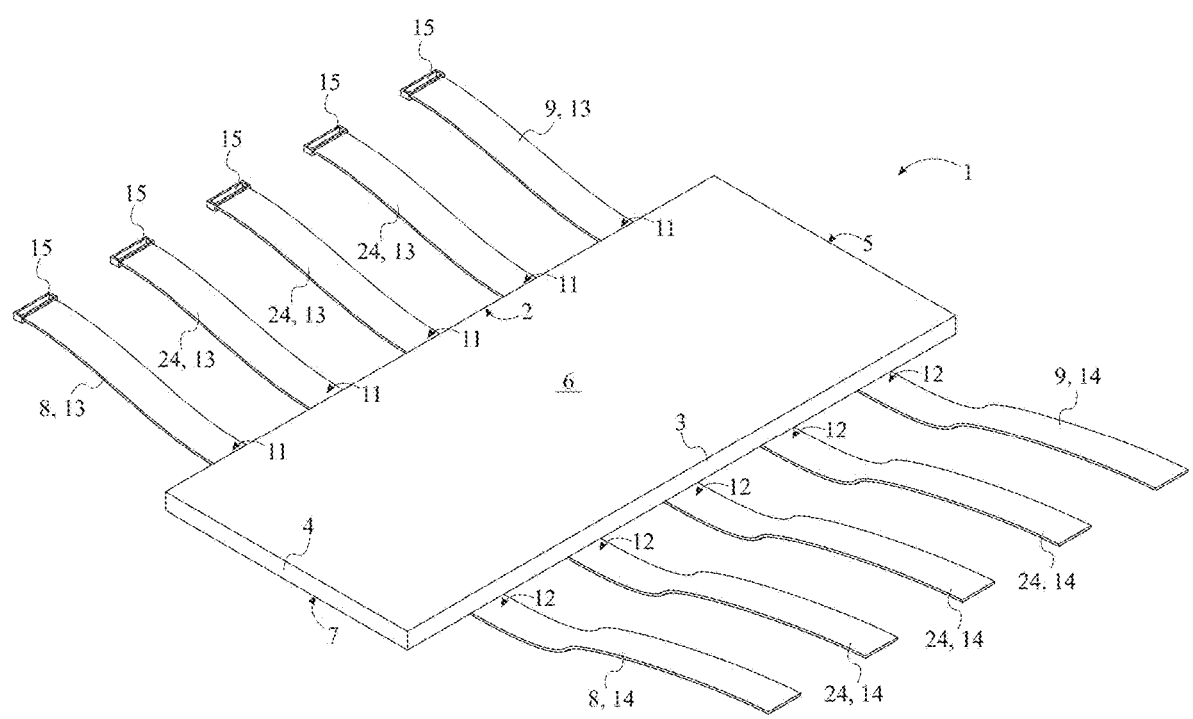
FIG. 1 is a top front perspective view of the present invention, wherein the restraining straps are shown disengaged, and wherein several intermediate restraining straps are shown.
Figure 2:
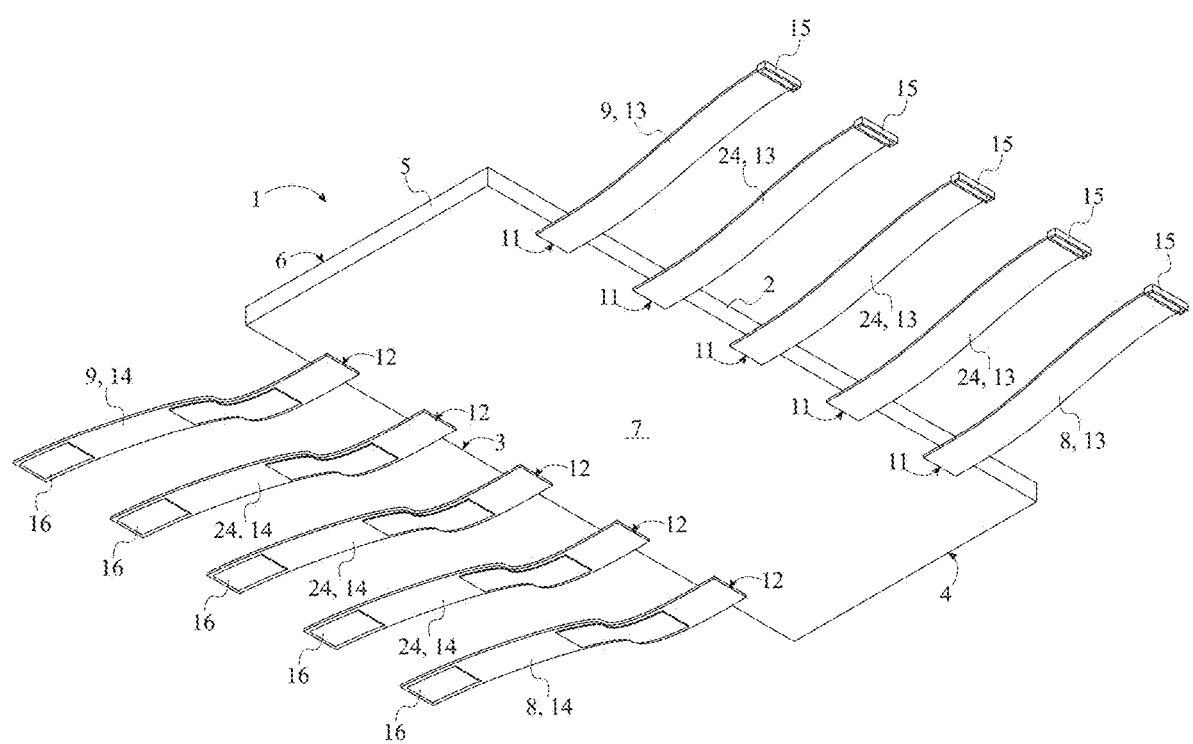
FIG. 2 is a bottom rear perspective view thereof.
Figure 3:
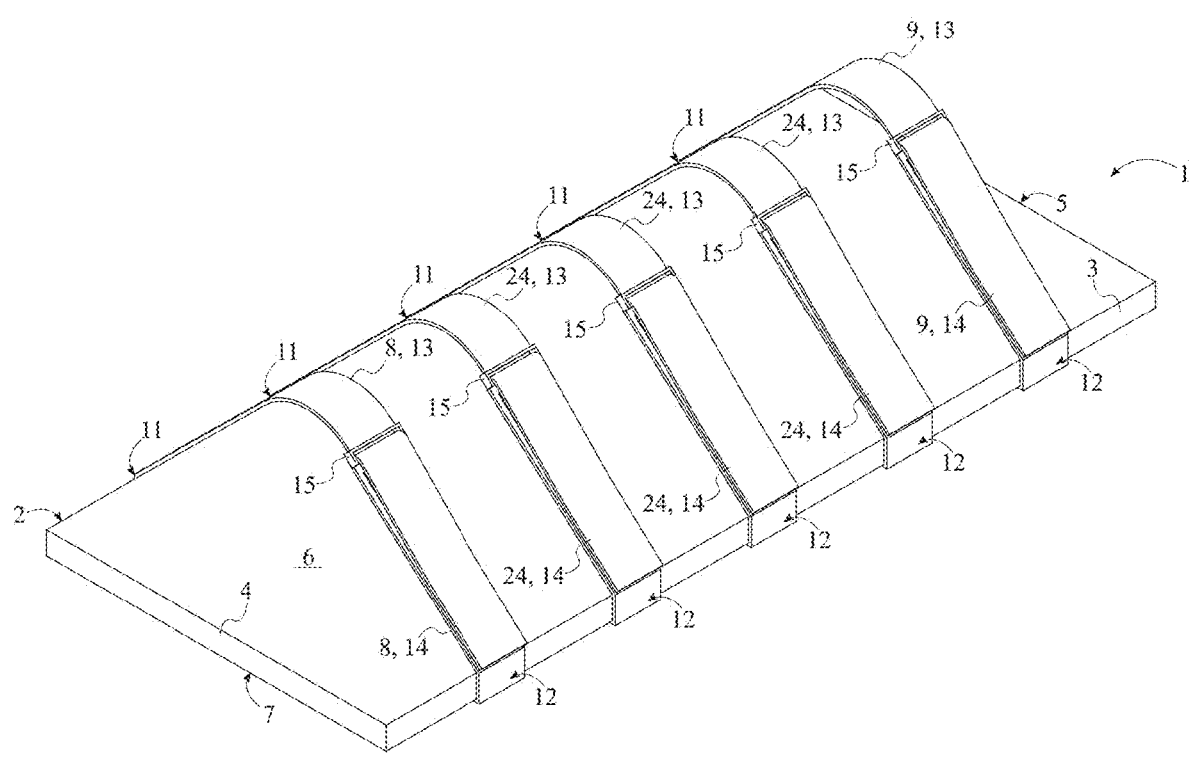
FIG. 3 is a top front perspective view thereof, wherein the restraining straps are shown engaged.
Figure 4:
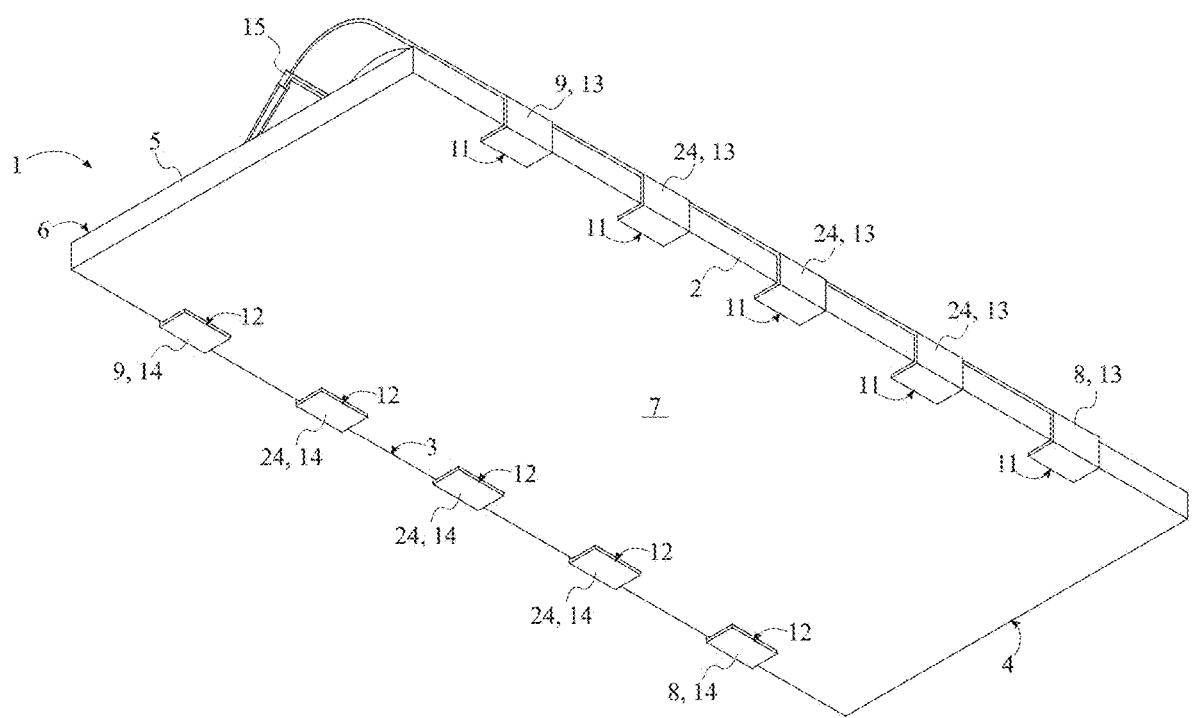
FIG. 4 is a bottom rear perspective view thereof.
Figure 5:
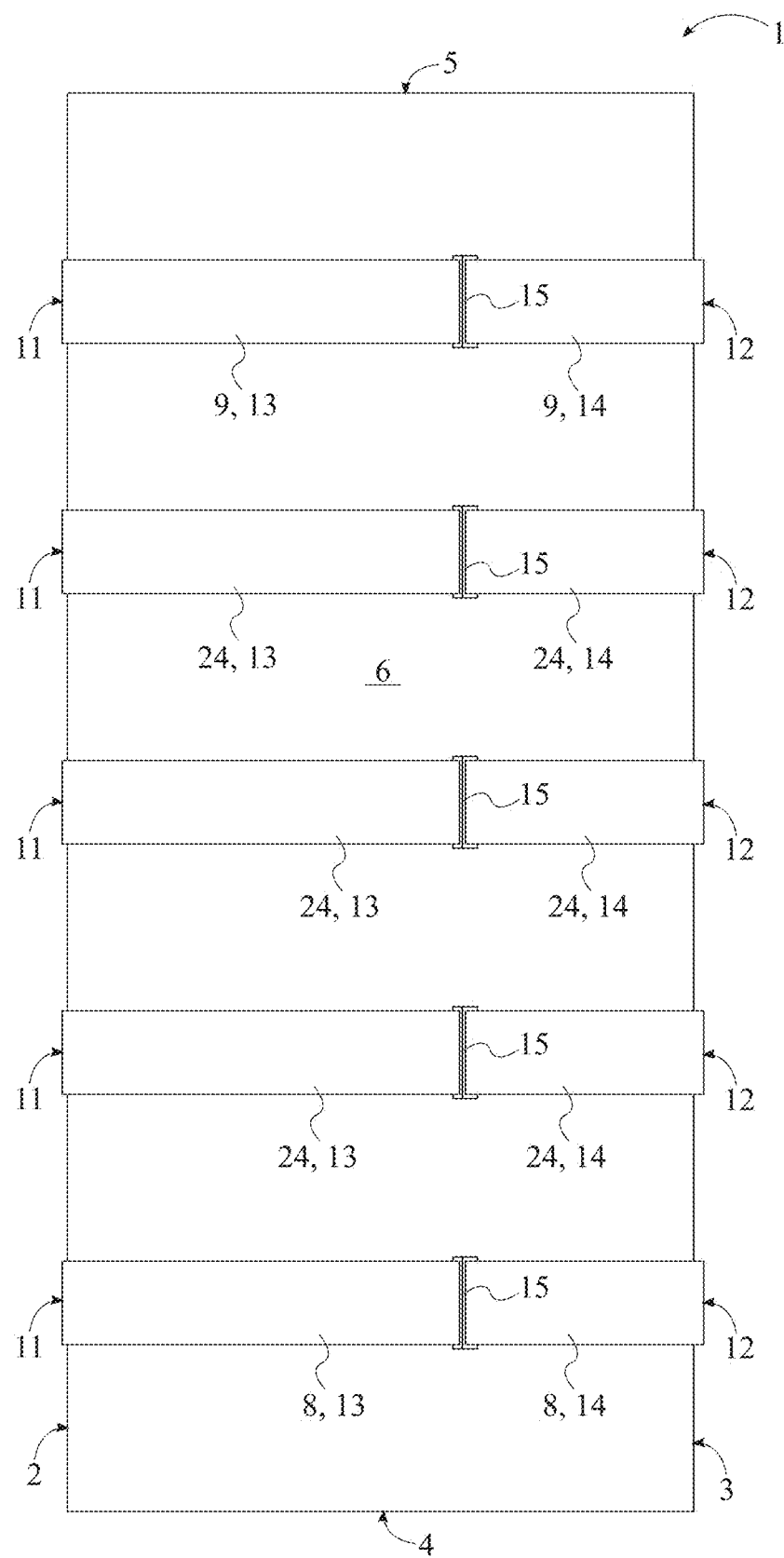
FIG. 5 is a top view thereof.
Figure 6:
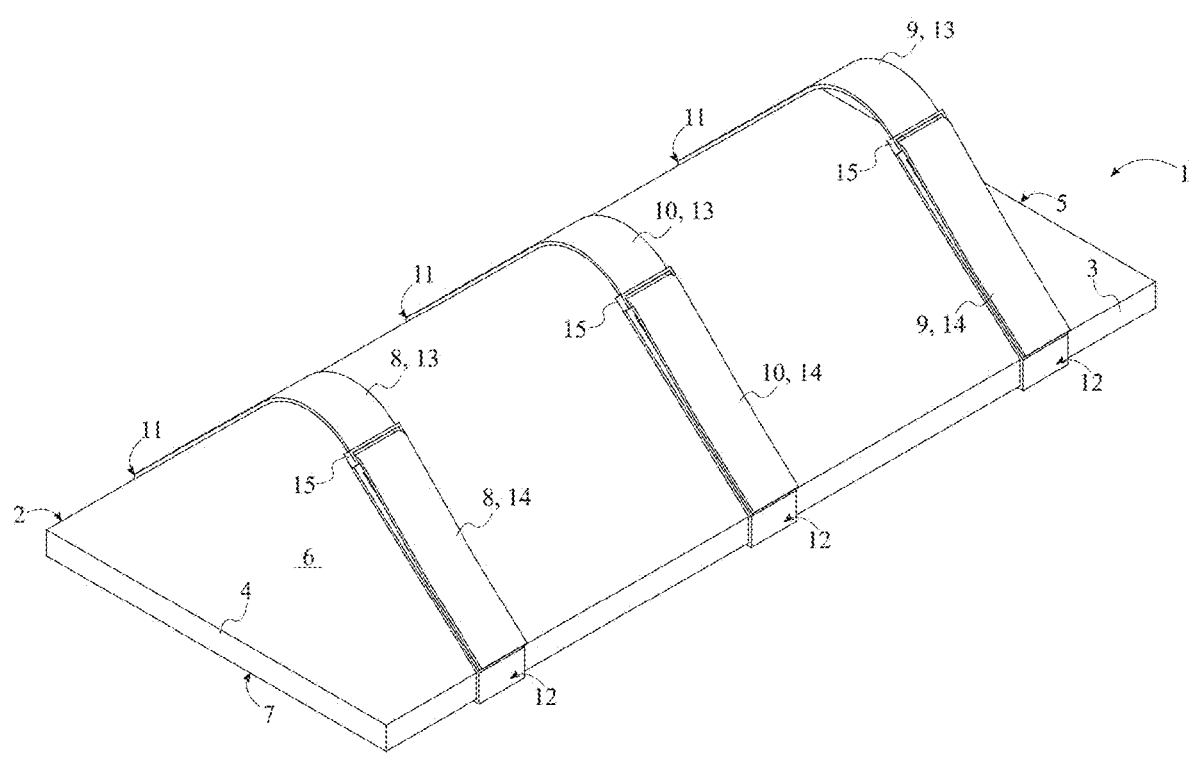
FIG. 6 is a top front perspective view thereof, wherein the restraining straps are shown engaged, and wherein a single intermediate restraining strap is shown.
Figure 23:
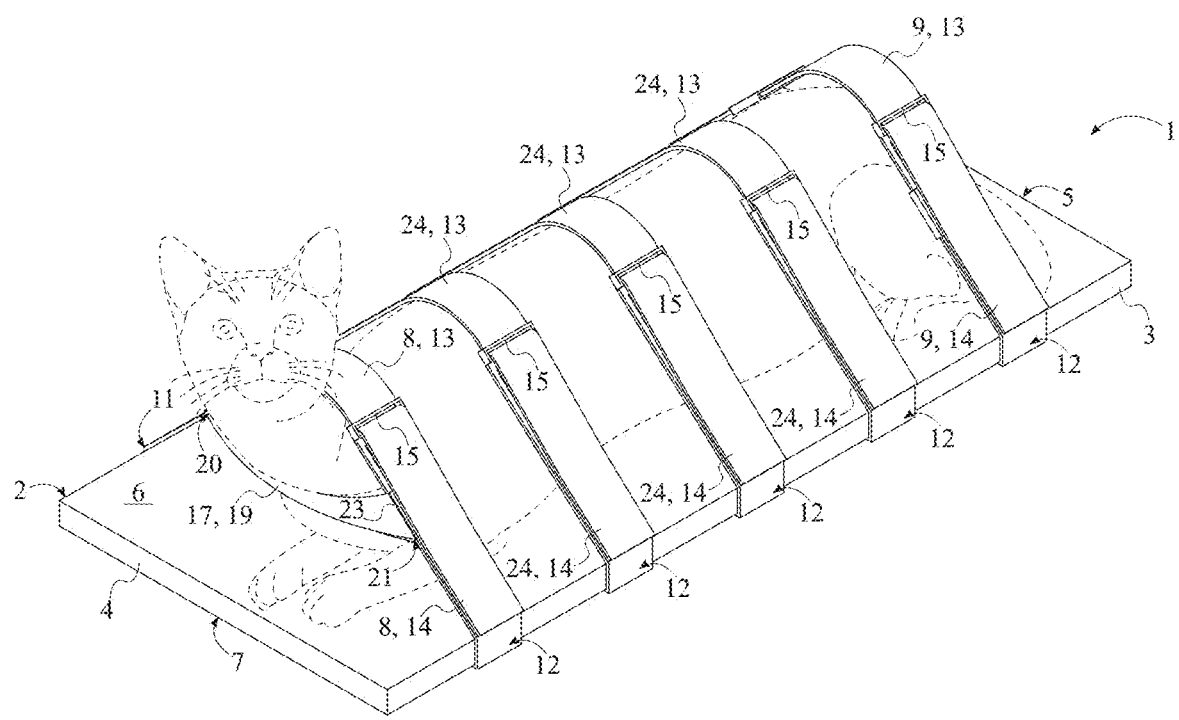
FIG. 23 is a top front perspective view of the present invention, wherein the restraining straps are shown engaged to restrain a pet, and wherein several intermediate restraining straps are shown.
Figure 24:
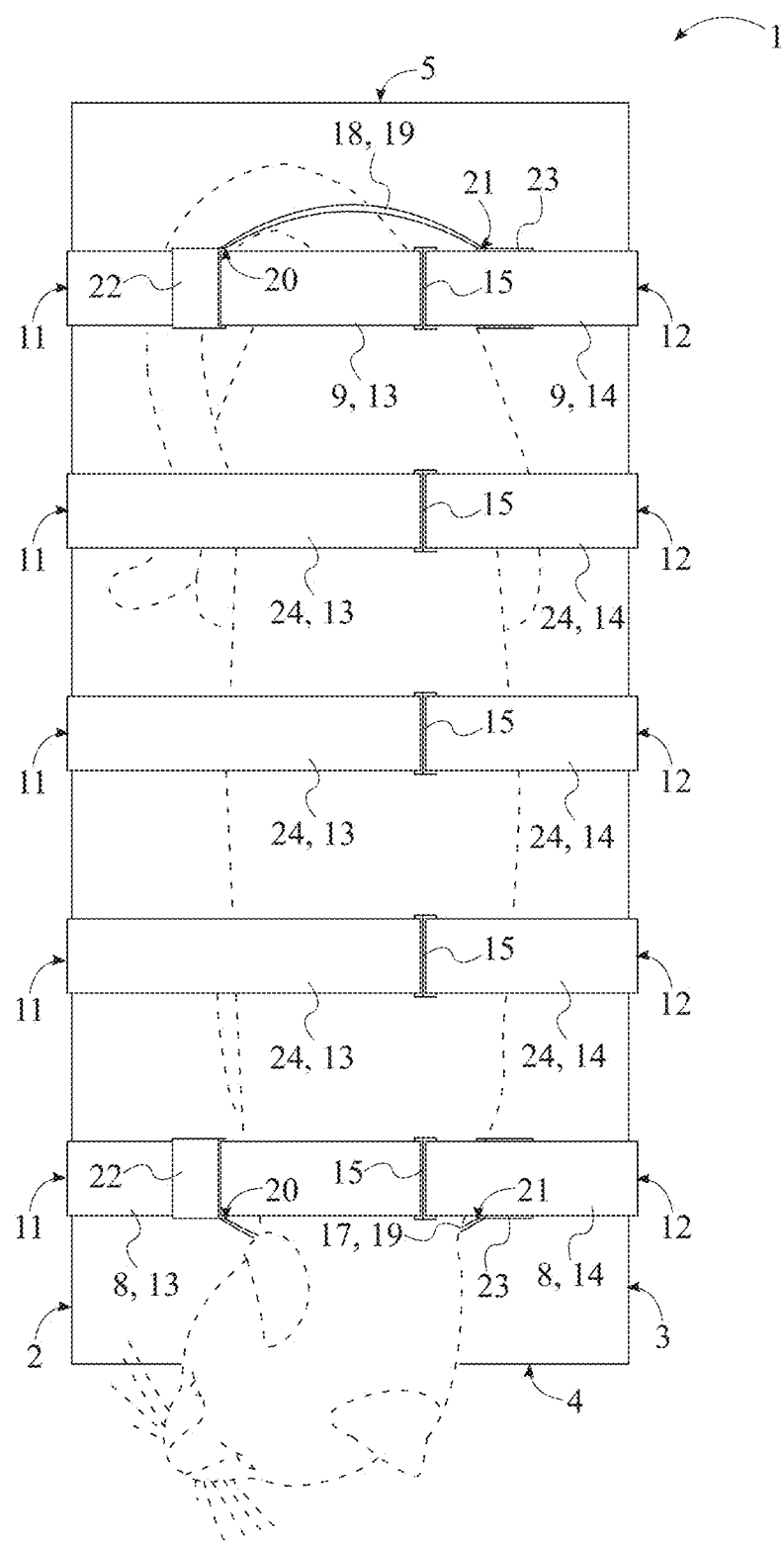
FIG. 24 is a top view thereof.

The present invention discloses a pet restraint device. The present invention allows the user to safely and comfortably restrain a pet so that the user can perform the necessary pet care without aid from another person. In the preferred embodiment, the present invention comprises a support base 1, a proximal restraining strap 8, a distal restraining strap 9, and at least one intermediate restraining strap 10, as can be seen in FIGS. 1 through 6, 23, and 24. The support base 1 provides a sturdy surface that is large enough to accommodate the pet being restrained in a safe and comfortable manner. The support base 1 also provides a structure where the proximal restraining strap 8, the at least one intermediate restraining strap 10, and the distal restraining strap 9 can be securely attached to. The proximal restraining strap 8, the at least one intermediate restraining strap 10, and the distal restraining strap 9 enable the user to restrain the pet to the support base 1 in a safe manner without covering the pet's body so that the user can have easier access to the pet's body. The proximal restraining strap 8, the at least one intermediate restraining strap 10, and the distal restraining strap 9 can be adjusted to match the pet's body.

The general configuration of the aforementioned components enables the user to safely restrain a pet without additional help from another person. As can be seen in FIG. 1 through 6, 23, and 24, the support base 1 is an elongated flat surface large enough to accommodate a wide variety of pets including, but not limited to, dogs, cats, etc. The support base 1 can also have different shapes and designs, such as a rectangular shape, a square shape, etc. In general, the support base 1 comprises a first lengthwise edge 2, a second lengthwise edge 3, a first widthwise edge 4, and a second widthwise edge 5. The first lengthwise edge 2 and the second lengthwise edge 3 correspond to the longer opposite lateral edges of the support base 1. Further, the first widthwise edge 4 and the second widthwise edge 5 correspond to the shorter opposite lateral edges of the support base 1. Furthermore, the proximal restraining strap 8, the at least one intermediate restraining strap 10, and the distal restraining strap 9 are length-adjustable straps that can be wrapped around different sections of the pet's body. For example, each restraining strap can be a two-inch (in.) strap made from nylon securing cord. The proximal restraining strap 8, the at least one intermediate restraining strap 10, and the distal restraining strap 9 also each comprises a first strap end 11 and a second strap end 12 corresponding to the terminal ends of each restraining strap.

In the preferred embodiment, the present invention can be arranged as follows: the proximal restraining strap 8, the at least one intermediate restraining strap 10, and the distal restraining strap 9 are distributed along the support base 1 to accommodate the pet's body size, as can be seen in FIG. 1 through 6, 23, and 24. The proximal restraining strap 8 is positioned adjacent to the first widthwise edge 4 so that the proximal restraining strap 8 can be wrapped around the pet's front side. In addition, the distal restraining strap 9 is positioned adjacent to the second widthwise edge 5 so that the distal restraining strap 9 can be wrapped around the pet's rear side. The at least one intermediate restraining strap 10 is positioned in between the proximal restraining strap 8 and the distal restraining strap 9 so that the at least one intermediate restraining strap 10 can be wrapped around the pet's mid-section. Further, the first strap end 11 of the proximal restraining strap 8, the first strap end 11 of the at least one intermediate restraining strap 10, and the first strap end 11 of the distal restraining strap 9 are each mounted onto the support base 1, adjacent to the first lengthwise edge 2, so that the first strap end 11 of each restraining strap is secured to the support base 1. On the other hand, the second strap end 12 of the proximal restraining strap 8, the second strap end 12 of the at least one intermediate restraining strap 10, and the second strap end 12 of the distal restraining strap 9 are each mounted onto the support base 1, adjacent to the second lengthwise edge 3, so that the second strap end 12 of each restraining strap is also secure to the support base 1. In other embodiments, each restraining strap can be arranged in different configurations around the support base 1.

As previously discussed, the support base 1 can have different shapes and sizes. In one embodiment, the support base 1 is a rectangular base large enough to accommodate the desired pet, as can be seen in FIG. 1 through 6, 23, and 24. In this embodiment, the first lengthwise edge 2 is positioned parallel and opposite to the second lengthwise edge 3 across the support base 1 due to the rectangular shape of the support base 1. Similarly, the first widthwise edge 4 is positioned parallel and opposite to the second widthwise edge 5 across the support base 1 due to the rectangular shape of the support base 1. The size of the support base 1 can be modified to accommodate specific pets. For example, the support base 1 can have a length of 34 in. and a width of 15 in. The thickness of the support base 1 can vary depending on the material used to make the support base 1. Further, the first lengthwise edge 2 is positioned perpendicular to the first widthwise edge 4 also due to the rectangular shape of the support base 1. Furthermore, the proximal restraining strap 8, the at least one intermediate restraining strap 10, and the distal restraining strap 9 are positioned parallel to each other to restrain the pet's body in a comfortable manner. Each restraining strap can be equally spaced at four in. away from each other along the support base 1. In addition, the proximal restraining strap 8 is positioned four in. away from the first widthwise edge 4, and the distal restraining strap 9 is also positioned four in. away from the second widthwise edge 5. In alternate embodiments, the restraining straps can be rearranged to accommodate different shapes of the support base 1.

Figure 7:
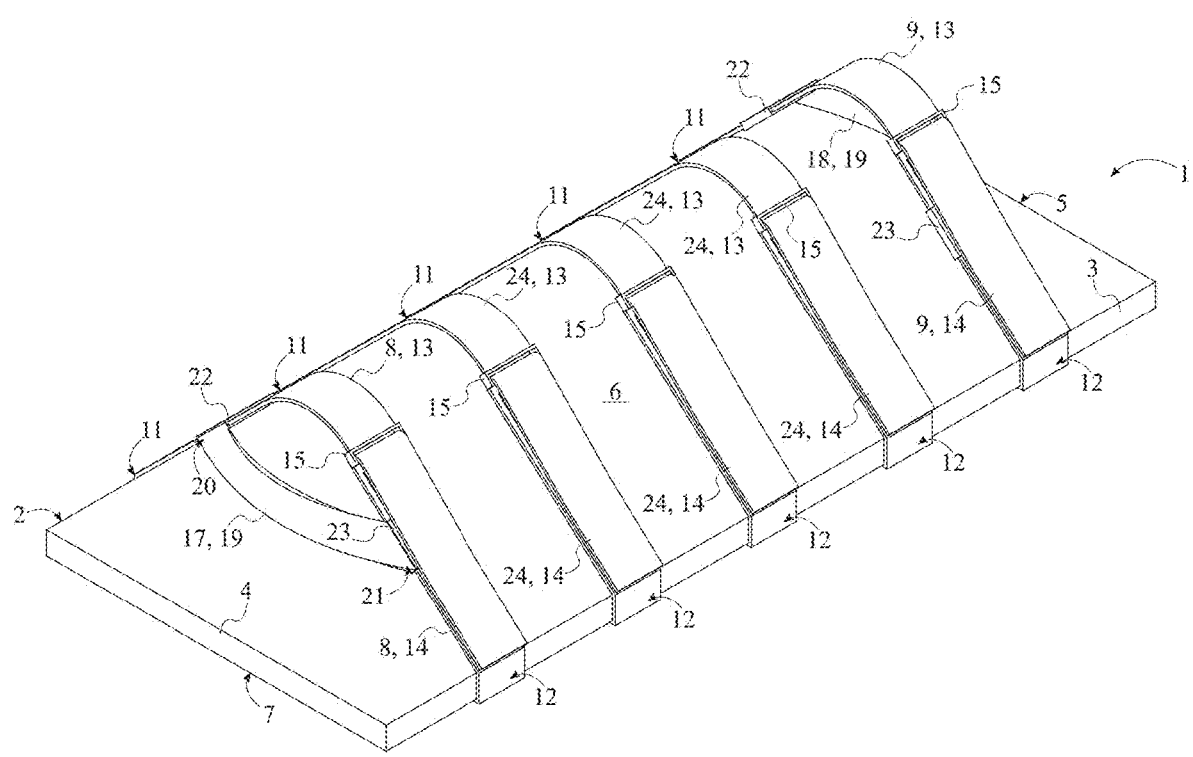
FIG. 7 is a top front perspective view of the present invention, wherein the restraining straps are shown engaged, wherein several intermediate restraining straps are shown, and wherein a chest restraining strap and a rear restraining strap are shown.
Figure 8:
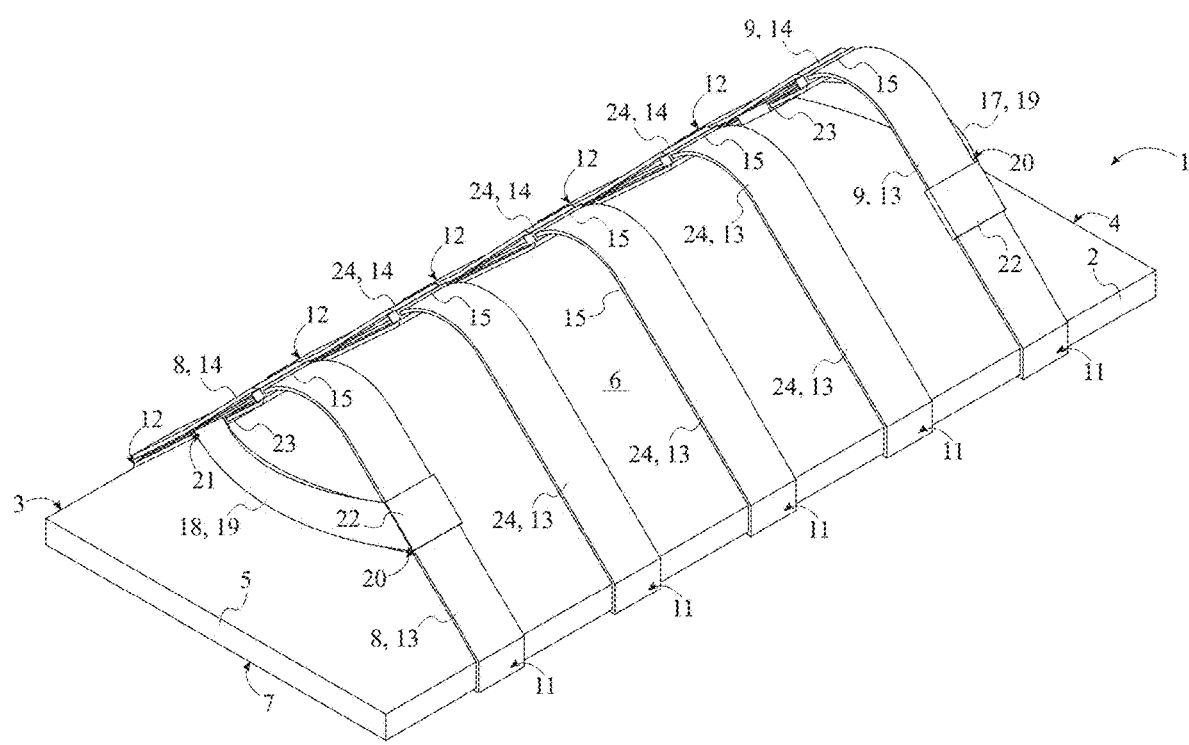
FIG. 8 is a top rear perspective view thereof.
Figure 21:
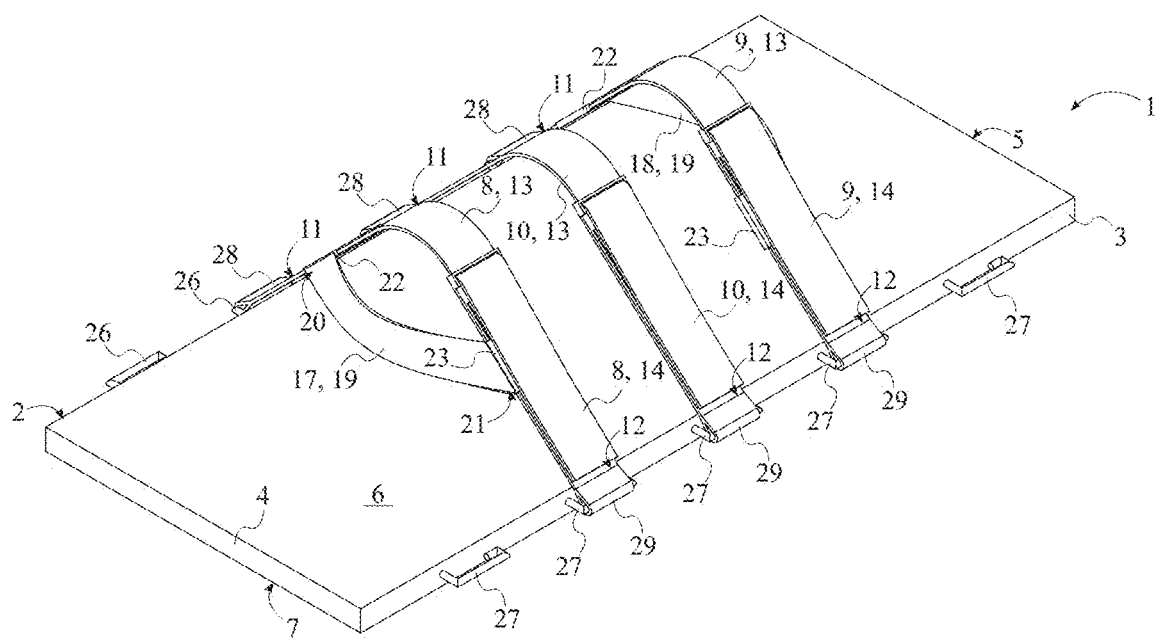
FIG. 21 is a top front perspective view of the present invention, wherein the restraining straps are shown engaged, wherein a single intermediate restraining strap is shown, and wherein the chest restraining strap and the rear restraining strap are shown.
Figure 22:
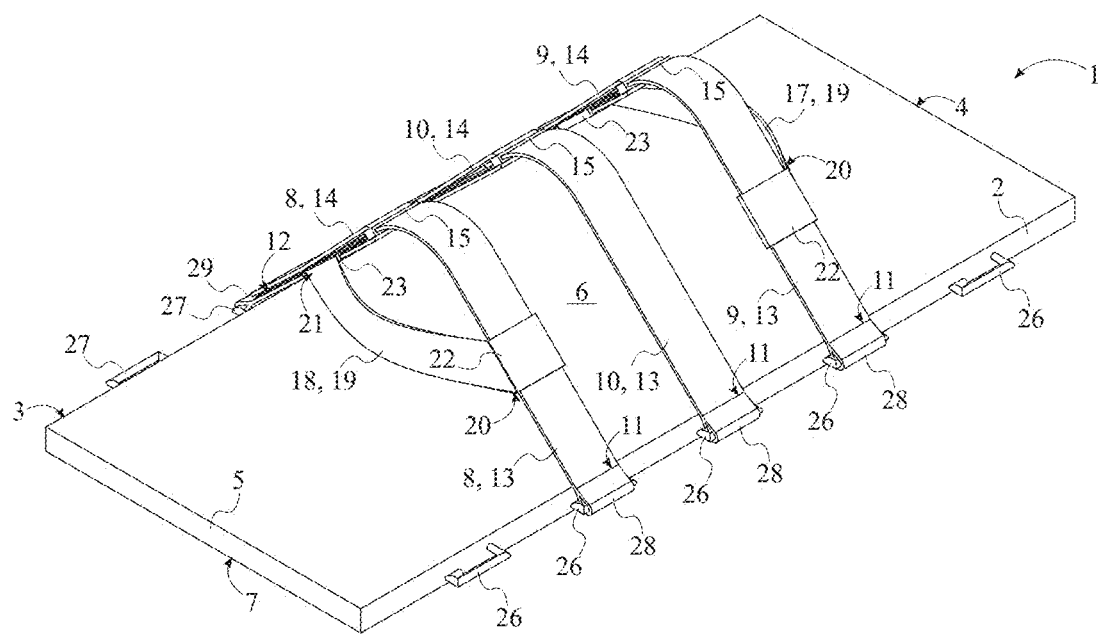
FIG. 22 is a top rear perspective view thereof.

In some embodiments, the present invention can include additional restraining features to prevent the pet from coming loose when restrained on the present invention. As can be seen in FIGS. 7, 8, 21, and 22, the present invention may further comprise a chest restraining band 17 and a rear restraining band 18. The chest restraining band 17 prevents the pet from moving forward when restrained to the support base 1. On the other hand, the rear restraining band 18 prevents the pet from moving backward when restrained to the support base 1. The chest restraining band 17 and the rear restraining band 18 correspond to two elongated bands with a width large enough to comfortably restrain the pet's body. The chest restraining band 17 and the rear restraining band 18 each comprises a band body 19, a first band end 20, a second band end 21, a first band loop 22, and a second band loop 23. The band body 19 corresponds to the main structure of each restraining band. The first band end 20 and the second band end 21 correspond to the terminal ends of the band body 19. Further, the first band loop 22 and the second band loop 23 correspond to the structure that facilitates the attachment of the band body 19 to the corresponding restraining strap.

As can be seen in FIGS. 7, 8, 21, and 22, the chest restraining band 17 and the rear restraining band 18 can be arranged as follows: the first band end 20 is positioned opposite to the second band end 21 along the band body 19 due to the elongated design of the band body 19. The first band loop 22 is terminally integrated into the first band end 20 to secure the first band loop 22 to the band body 19. Similarly, the second band loop 23 is also terminally integrated into the second band end 21 to secure the second band loop 23 to the band body 19. Further, the first band loop 22 is positioned adjacent to the first lengthwise edge 2, while the second band loop 23 is positioned adjacent to the second lengthwise edge 3. This way, the chest restraining band 17 and the rear restraining band 18 match the arrangement of the restraining straps. Further, the proximal restraining strap 8 is slidably engaged through the first band loop 22 and the second band loop 23 of the chest restraining band 17 so that the chest restraining band 17 is secured to the proximal restraining strap 8. Likewise, the distal restraining strap 9 is also slidably engaged through the first band loop 22 and the second band loop 23 of the rear restraining band 18 so that the rear restraining band 18 is secured to the distal restraining strap 9. In other embodiments, the chest restraining band 17 and the rear restraining band 18 can be arranged differently.

As previously discussed, the restraining straps are provided as length-adjustable straps that can be adjusted to match the pet's body size. As can be seen in FIG. 1 through 6, 23, and 24, the proximal restraining strap 8, the at least one intermediate restraining strap 10, and the distal restraining strap 9 may each further comprise a first strap member 13, a second strap member 14, and a strap eyelet 15. The first strap member 13 and the second strap member 14 correspond to the two separate members of each restraining strap that can be fastened to each other at different lengths. Each restraining strap can be arranged as follows: the first strap member 13 is positioned coincident to the first strap end 11, while the second strap member 14 is positioned coincident to the second strap end 12. This way, each restraining strap spans the width of the support base 1. In addition, the strap eyelet 15 is terminally connected to the first strap member 13, offset from the first strap end 11, to secure the strap eyelet 15 to the free end of the first strap member 13. Further, to connect the two strap members together, the second strap member 14 is looped through the strap eyelet 15, offset from the second strap end 12. This way, the user can adjust the working length of each restraining strap to accommodate the overall size of the pet's body.

As can be seen in FIG. 1 through 6, 23, and 24, to secure the working length of each restraining strap, the proximal restraining strap 8, the at least one intermediate restraining strap 10, and the distal restraining strap 9 may each further comprise a strap fastener 16. The strap fastener 16 allows the user to secure the working length of each restraining strap to ensure that the pet is securely restrained to the support base 1. To do so, the strap fastener 16 is mounted onto the second strap member 14, offset from the second strap end 12, so that the strap fastener 16 is secured to the second strap member 14. Thus, when the second strap member 14 is looped through the strap eyelet 15, the strap fastener 16 is attached onto the second strap member 14, adjacent to the second strap end 12. For example, the strap fastener 16 can be a hook and loop fastener, with the hook portion of the strap fastener 16 being positioned adjacent to the free end of the second strap member 14. The loop portion of the strap fastener 16 can be provided adjacent to the second strap end 12. This way, the user can engage the hook portion to the loop portion of the strap fastener 16 at different lengths along the second strap member 14. In other embodiments, different fasteners can be implemented that allow for the adjustment of the working length of each restraining strap.

For larger pets, additional restraining straps may be necessary. In some embodiments, the at least one intermediate restraining strap 10 can be a plurality of intermediate restraining straps 24 that allow for larger pets to be securely restrained to the support base 1, as can be seen in FIG. 1 through 5, 23, and 24. The plurality of intermediate restraining straps 24 is distributed along the support base 1 so that the plurality of intermediate restraining straps 24 provide enough support to the pet's body. In other embodiments, additional restraining straps can be provided to help secure the pet with the present invention.

As previously discussed, the support base 1 is an overall elongated flat structure that accommodates the desired pet. As can be seen in FIG. 1 through 6, 23, and 24, the support base 1 may further comprise a first base surface 6 and a second base surface 7 corresponding to the largest surfaces of the support base 1. In addition, the first base surface 6 is positioned opposite to the second base surface 7 across the support base 1 due to the overall flat shape of the support base 1. This design of the support base 1 allows the proximal restraining strap 8, the at least one intermediate restraining strap 10, and the distal restraining strap 9 to be secured to the support base 1 in different ways to allow for different configurations of the present invention.

As can be seen in FIG. 1 through 6, 23, and 24, in one embodiment, the proximal restraining strap 8, the at least one intermediate restraining strap 10, and the distal restraining strap 9 can be permanently attached to the support base 1. In this embodiment, the first strap end 11 of the proximal restraining strap 8, the first strap end 11 of the at least one intermediate restraining strap 10, and the first strap end 11 of the distal restraining strap 9 are each directly connected to the second base surface 7, adjacent to the first lengthwise edge 2. Similarly, the second strap end 12 of the proximal restraining strap 8, the second strap end 12 of the at least one intermediate restraining strap 10, and the second strap end 12 of the distal restraining strap 9 are each directly connected to the second base surface 7, adjacent to the second lengthwise edge 3. This way, the proximal restraining strap 8, the at least one intermediate restraining strap 10, and the distal restraining strap 9 are permanently fixed to the support base 1.

Figure 9:
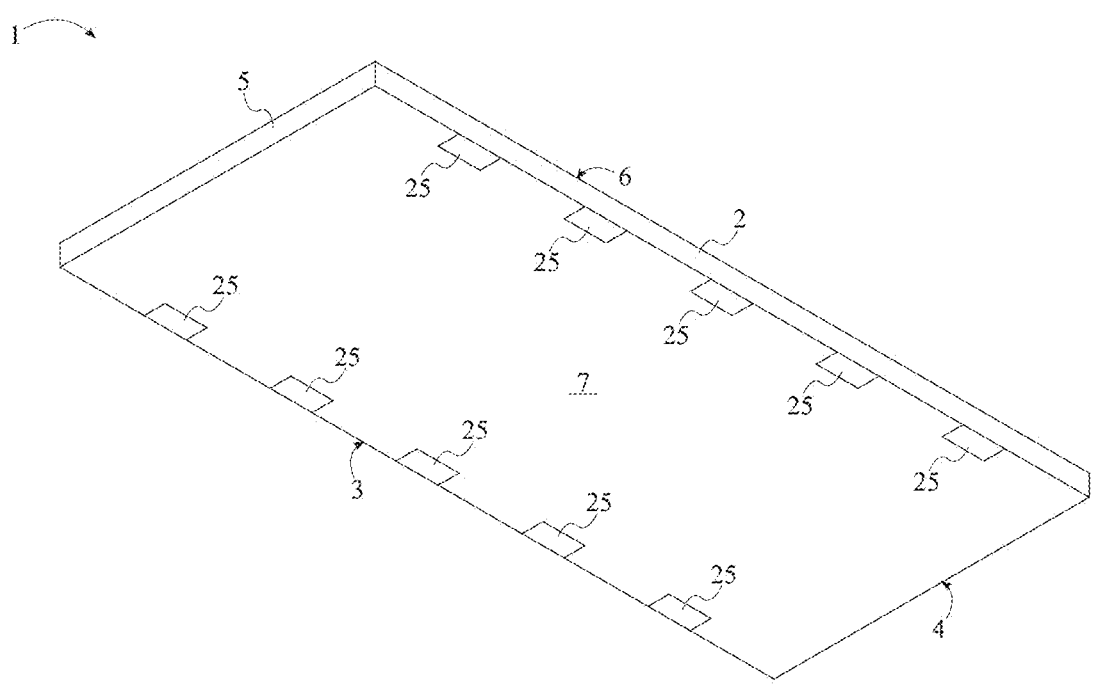
FIG. 9 is a bottom rear perspective view of a first embodiment of the support base of the present invention.
Figure 10:
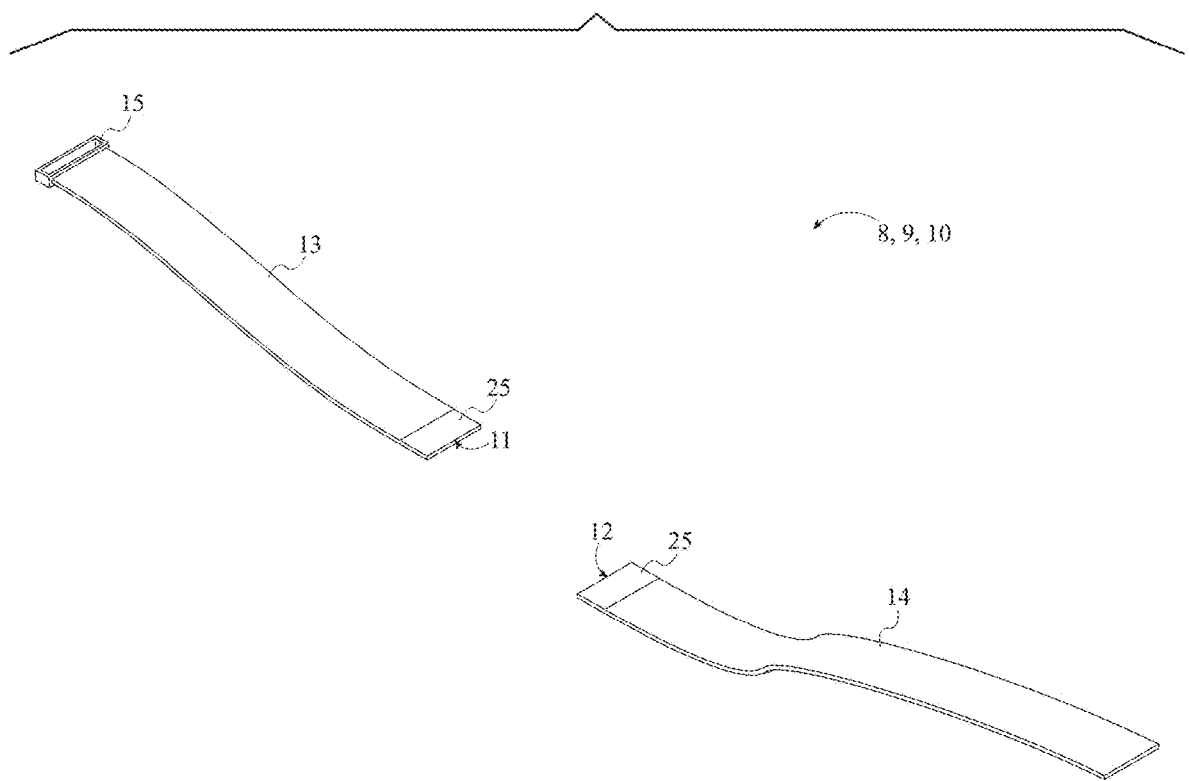
FIG. 10 is a top front perspective view of a first embodiment of the restraining strap of the present invention.
Figure 11:
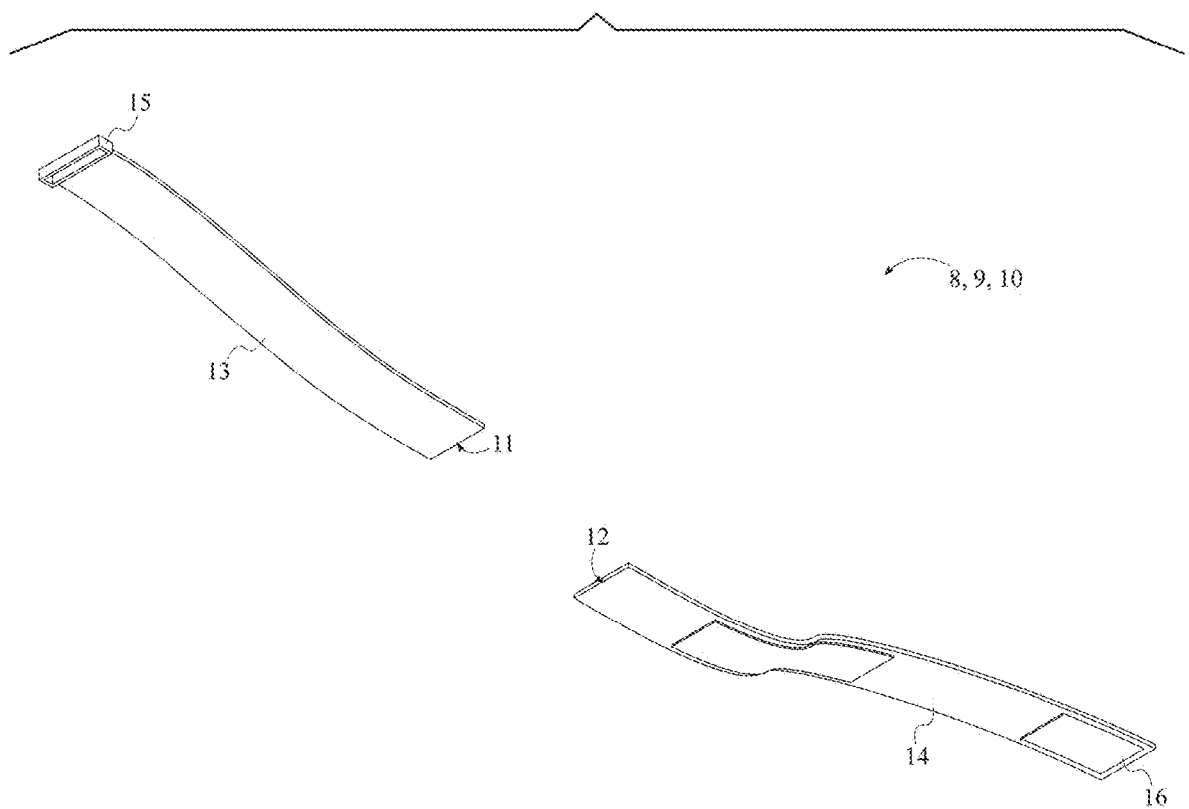
FIG. 11 is a bottom front perspective view thereof.
Figure 12:
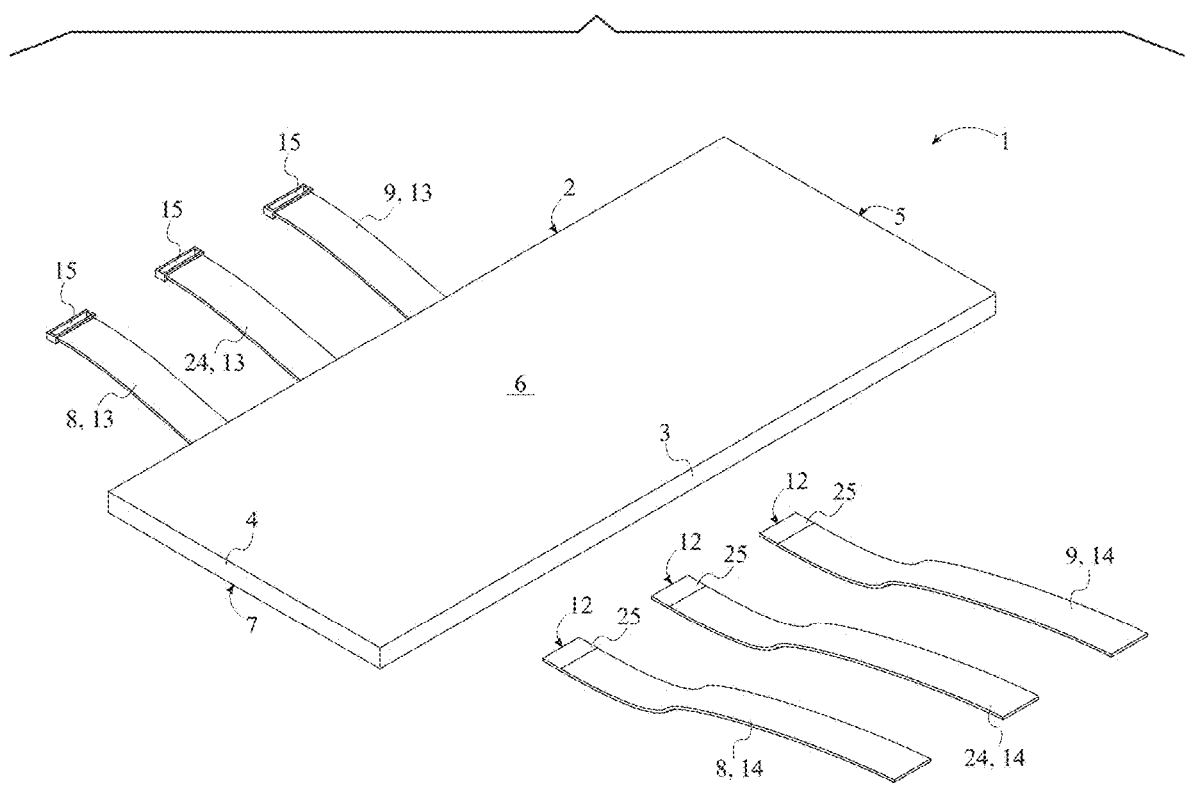
FIG. 12 is an exploded top front perspective view of the first embodiment of the present invention, wherein the restraining straps are shown detached from the support base.
Figure 13:
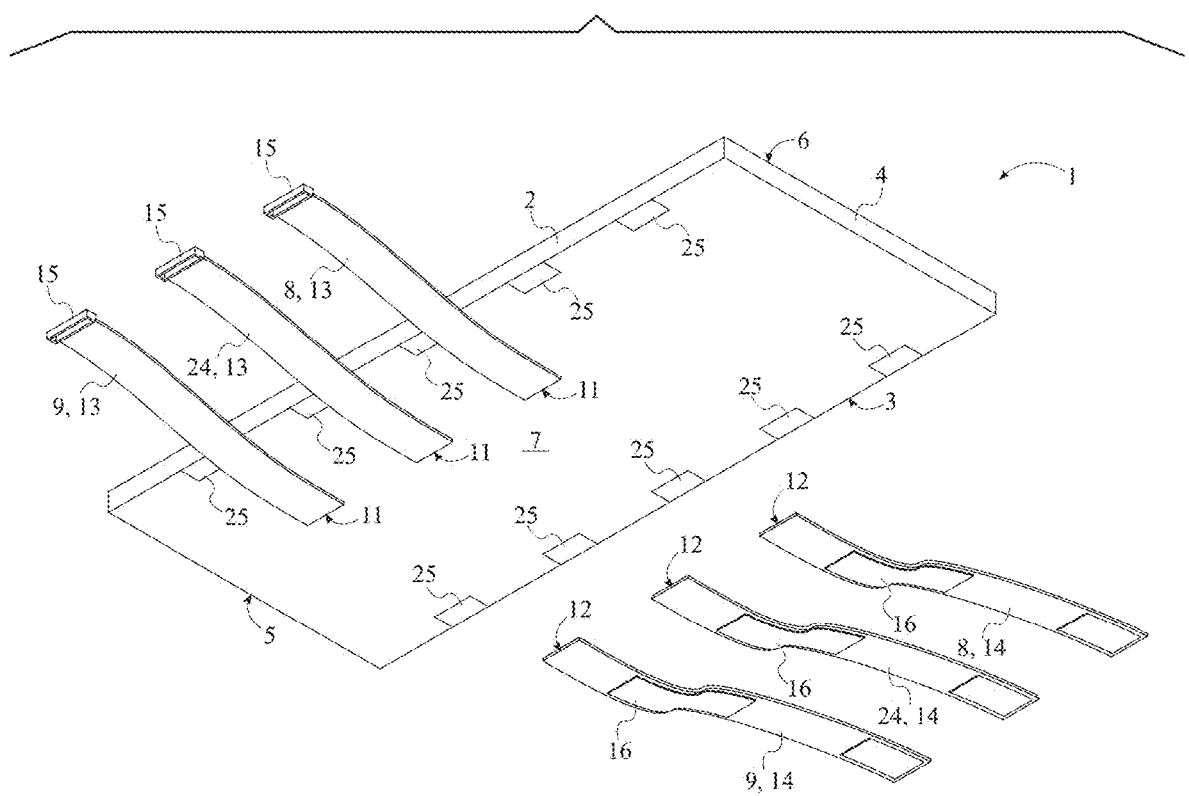
FIG. 13 is an exploded bottom front perspective view thereof.
Figure 14:
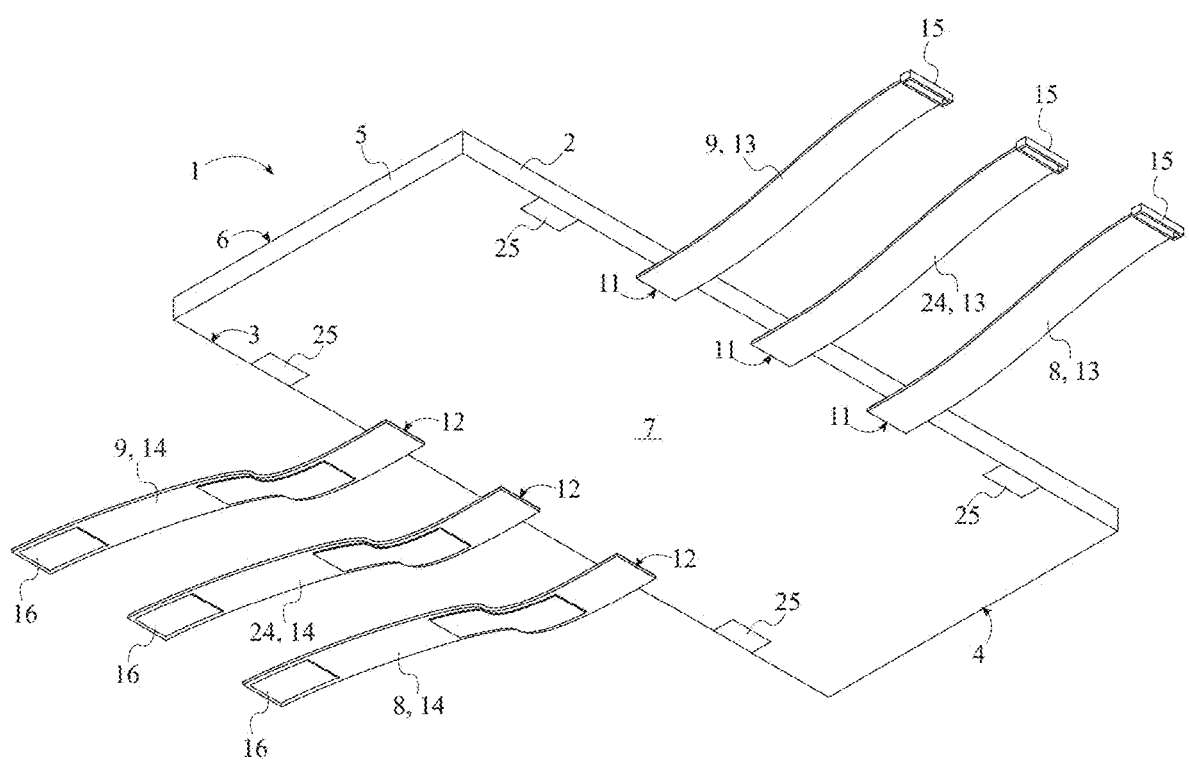
FIG. 14 is a bottom rear perspective view thereof, wherein the restraining straps are shown attached to the support base.

As can be seen in FIG. 9 through 14, in another embodiment, the proximal restraining strap 8, the at least one intermediate restraining strap 10, and the distal restraining strap 9 can be removably attached to the support base 1 to allow the user to attach or remove the restraining straps necessary to restrain the target pet. To do so, the present invention may further comprise a plurality of base fasteners 25 that facilitate the removable attachment of the restraining straps to the support base 1. For example, the plurality of base fasteners 25 can be hook and loop fasteners, with the hook portion of each base fastener being positioned on the strap ends of each restraining strap. The loop portion of each base fastener can be provided on the second base surface 7 along the lengthwise edges of the support base 1. This way, the user can engage the hook portion of each base fastener to the corresponding loop portion to attach the desired restraining strap to the support base 1. The first strap end 11 of the proximal restraining strap 8, the first strap end 11 of the at least one intermediate restraining strap 10, and the first strap end 11 of the distal restraining strap 9 are each attached to the second base surface 7 by a corresponding strap fastener 16 of the plurality of strap fastener 16s, adjacent to the first lengthwise edge 2. Similarly, the second strap end 12 of the proximal restraining strap 8, the second strap end 12 of the at least one intermediate restraining strap 10, and the second strap end 12 of the distal restraining strap 9 are each connected to the second base surface 7 by a corresponding strap fastener 16 of the plurality of strap fastener 16s, adjacent to the second lengthwise edge 3. This way, the user can attach or remove any retraining strap to accommodate the target pet. In other embodiments, different base fasteners can be implemented that allow for the removable attachment of the target restraining strap to the support base 1.

Figure 15:
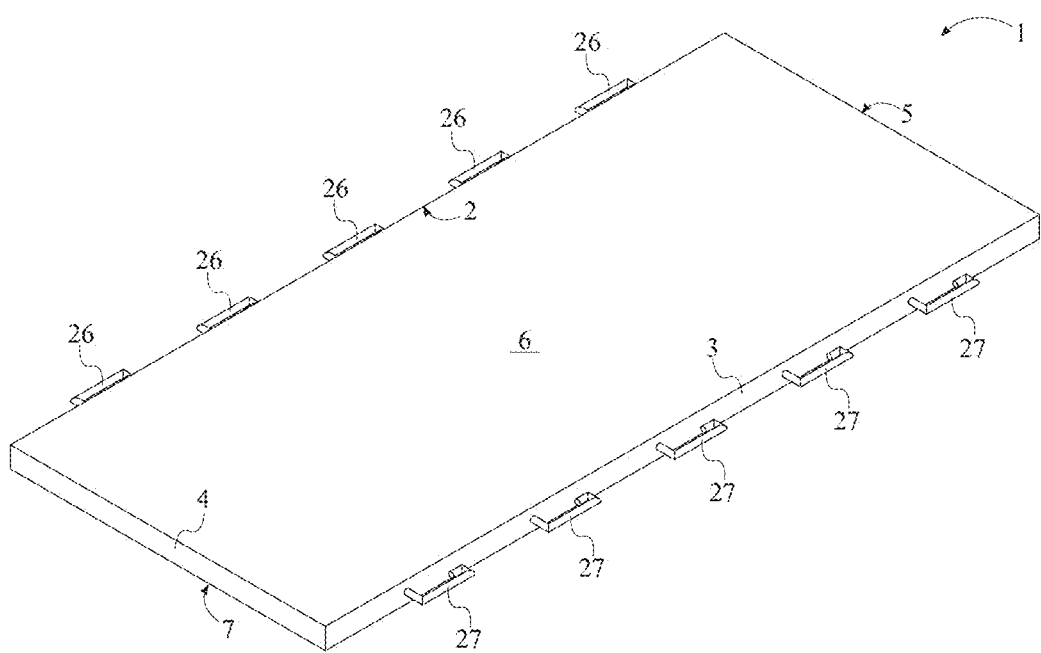
FIG. 15 is a top front perspective view of a second embodiment of the support base of the present invention.
Figure 16:
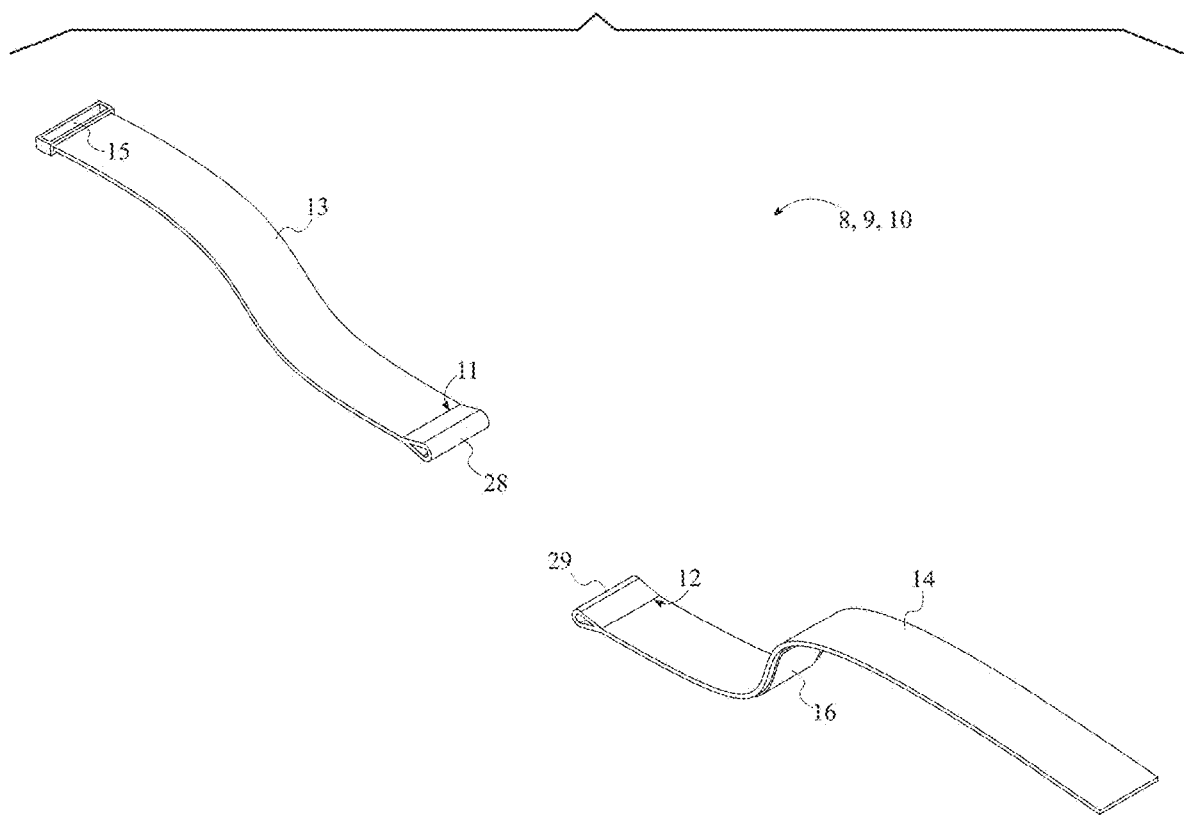
FIG. 16 is a top front perspective view of a second embodiment of the restraining strap of the present invention.
Figure 17:
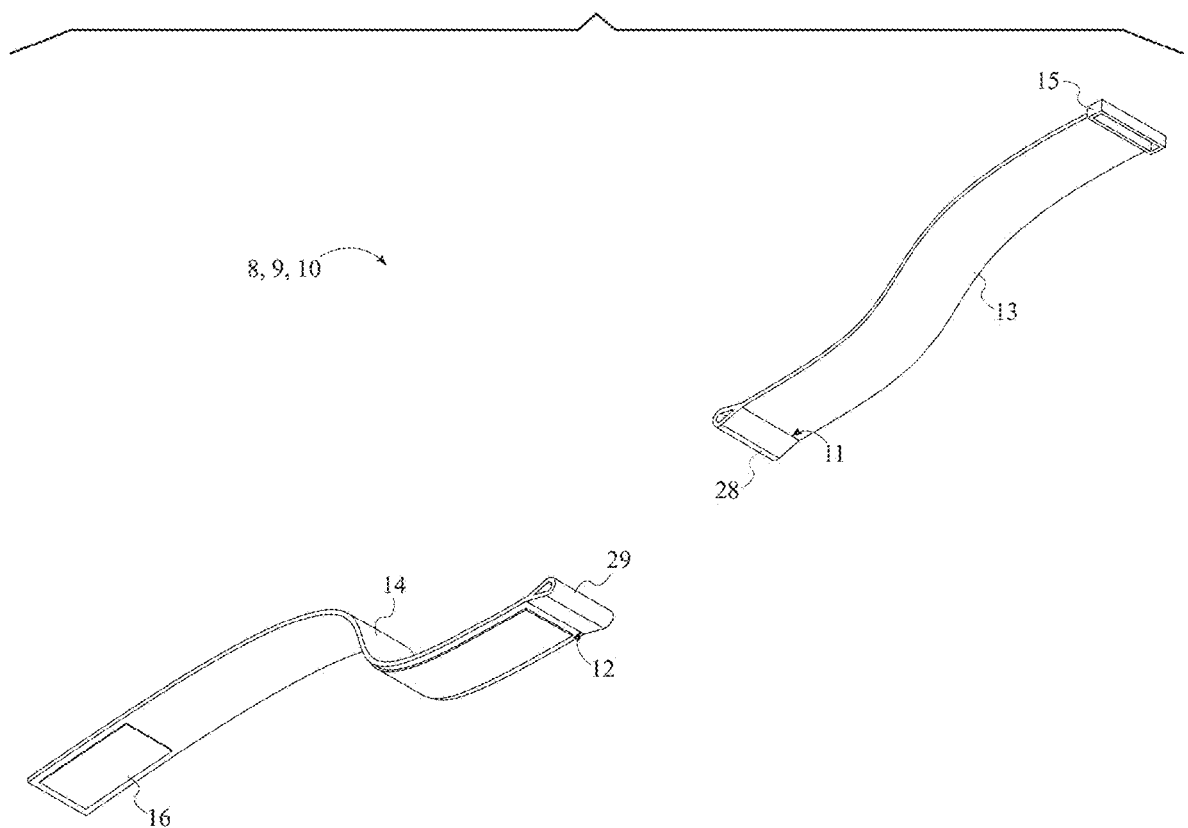
FIG. 17 is a bottom rear perspective view thereof.
Figure 18:
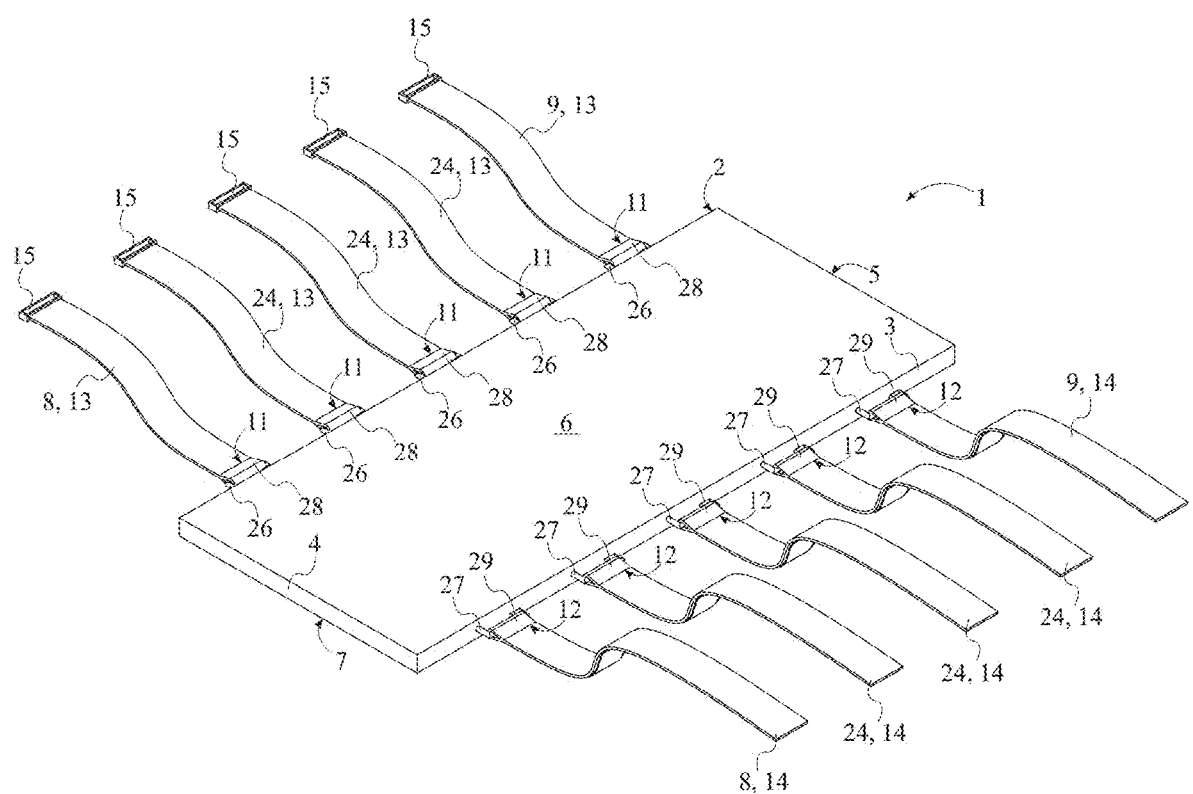
FIG. 18 is a top front perspective view thereof, wherein the restraining straps are shown disengaged, and wherein the restraining straps are shown attached to the support base.
Figure 19:
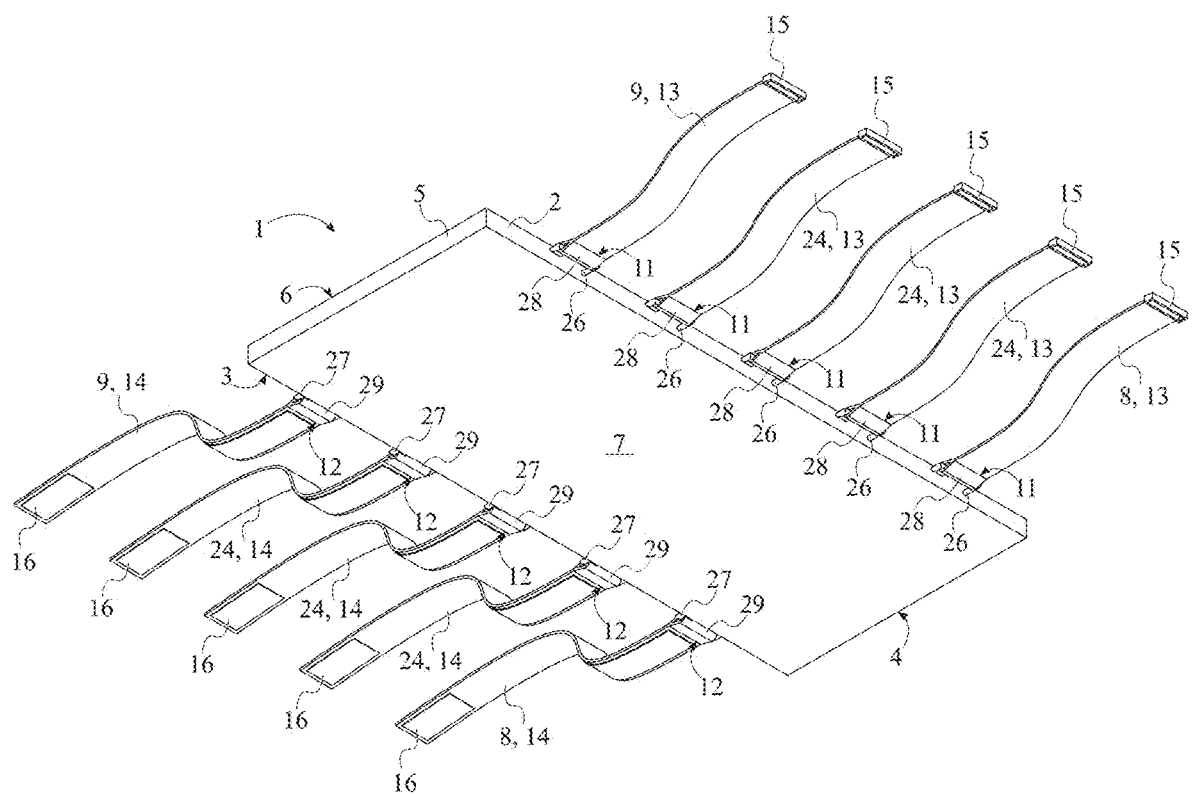
FIG. 19 is a bottom rear perspective view thereof.
Figure 20:
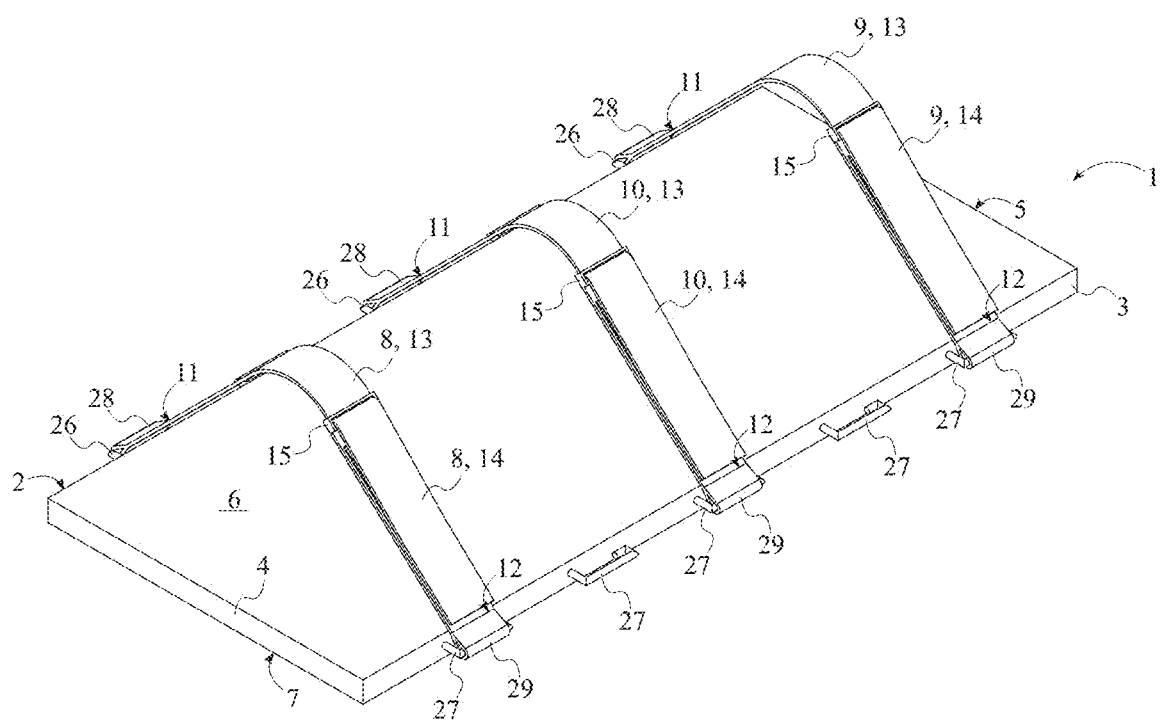
FIG. 20 is a top front perspective view thereof, wherein the restraining straps are shown engaged, and wherein a single intermediate restraining strap is shown.

In another embodiment, the proximal restraining strap 8, the at least one intermediate restraining strap 10, and the distal restraining strap 9 can be attached to the support base 1 without the use of the plurality of base fasteners 25. As can be seen in FIG. 15 through 22, the present invention may further comprise a plurality of first hooks 26 and a plurality of second hooks 27. The plurality of first hooks 26 and the plurality of second hooks 27 are designed to enable the secure attachment of the desired restraining strap to the support base 1. In addition, the proximal restraining strap 8, the at least one intermediate restraining strap 10, and the distal restraining strap 9 may each further comprise a first strap loop 28 and a second strap loop 29. The first strap loop 28 and the second strap loop 29 enable the engagement of the strap ends of the desired restraining strap to the corresponding first hook of the plurality of first hooks 26 and second hook of the plurality of second hooks 27, respectively.

As can be seen in FIG. 15 through 22, this embodiment of the present invention can be arranged as follows: each first strap loop 28 is terminally integrated into the corresponding first strap end 11 to secure each first strap loop 28 to the corresponding restraining strap. Similarly, each second strap loop 29 is terminally integrated into the corresponding second strap end 12 to secure each second strap loop 29 to the corresponding restraining strap. Further, the plurality of first hooks 26 is distributed along the first lengthwise edge 2, while the plurality of second hooks 27 is distributed along the second lengthwise edge 3. This way, the plurality of first hooks 26 and the plurality of second hooks 27 are evenly distributed along the support base 1. Further, each of the plurality of first hooks 26 is connected onto the first lengthwise edge 2 to secure the plurality of first hooks 26 to the support base 1. Likewise, each of the plurality of second hooks 27 is connected onto the second lengthwise edge 3 to secure the plurality of second hooks 27 to the support base 1. Furthermore, to attach the desired restraining straps to the support base 1, each first strap loop 28 is engaged with a corresponding first hook of the plurality of first hooks 26. This secures each first strap end 11 of the desired restraining straps to the corresponding first hooks of the plurality of first hooks 26. Similarly, each second strap loop 29 is engaged with a corresponding second hook of the plurality of second hooks 27 to secure each second strap end 12 of the desired restraining straps to the corresponding second hooks of the plurality of second hooks 27. In other embodiments, different base features can be integrated into the support base 1 to allow for the removable attachment of the restraining straps to the support base 1.

Although the invention has been explained in relation to its preferred embodiment, it is to be understood that many other possible modifications and variations can be made without departing from the spirit and scope of the invention.

What is claimed is:

1. A pet restraint device comprising:
   a support base;
   a proximal restraining strap;
   a distal restraining strap;
   at least one intermediate restraining strap;
   a chest restraining band;
   a rear restraining band;
   the support base comprising a first lengthwise edge, a second lengthwise edge, a first widthwise edge, and a second widthwise edge;
   the proximal restraining strap, the at least one intermediate restraining strap, and the distal restraining strap each comprising a first strap end and a second strap end;
   the proximal restraining strap, the at least one intermediate restraining strap, and the distal restraining strap being distributed along the support base;
   the proximal restraining strap being positioned adjacent to the first widthwise edge;
   the distal restraining strap being positioned adjacent to the second widthwise edge;
   the at least one intermediate restraining strap being positioned in between the proximal restraining strap and the distal restraining strap;
   the first strap end of the proximal restraining strap, the first strap end of the at least one intermediate restraining strap, and the first strap end of the distal restraining strap being each mounted onto the support base, adjacent to the first lengthwise edge;
   the second strap end of the proximal restraining strap, the second strap end of the at least one intermediate restraining strap, and the second strap end of the distal restraining strap being each mounted onto the support base, adjacent to the second lengthwise edge;
   the chest restraining band and the rear restraining band each comprising a band body, a first band end, a second band end, a first band loop, and a second band loop;
   the first band end being positioned opposite to the second band end along the band body;
   the first band loop being terminally integrated into the first band end;
   the second band loop being terminally integrated into the second band end;
   the first band loop being positioned adjacent to the first lengthwise edge;
   the second band loop being positioned adjacent to the second lengthwise edge;
   the proximal restraining strap being slidably engaged through the first band loop and the second band loop of the chest restraining band; and
   the distal restraining strap being slidably engaged through the first band loop and the second band loop of the rear restraining band.

2. The pet restraint device as claimed in claim 1 further comprising:
the support base being a rectangular base;
the first lengthwise edge being positioned parallel and opposite to the second lengthwise edge across the support base;
the first widthwise edge being positioned parallel and opposite to the second widthwise edge across the support base;
the first lengthwise edge being positioned perpendicular to the first widthwise edge; and
the proximal restraining strap, the at least one intermediate restraining strap, and the distal restraining strap being positioned parallel to each other.

3. The pet restraint device as claimed in claim 1 further comprising:
the proximal restraining strap, the at least one intermediate restraining strap, and the distal restraining strap each further comprising a first strap member, a second strap member, and a strap eyelet;
the first strap member being positioned coincident to the first strap end;
the second strap member being positioned coincident to the second strap end;
the strap eyelet being terminally connected to the first strap member, offset from the first strap end; and
the second strap member being looped through the strap eyelet, offset from the second strap end.

4. The pet restraint device as claimed in claim 3 further comprising:
the proximal restraining strap, the at least one intermediate restraining strap, and the distal restraining strap each further comprising a strap fastener;
the strap fastener being mounted onto the second strap member, offset from the second strap end; and
the strap fastener being attached onto the second strap member, adjacent to the second strap end.

5. The pet restraint device as claimed in claim 1 further comprising:
the at least one intermediate restraining strap being a plurality of intermediate restraining straps; and
the plurality of intermediate restraining straps being distributed along the support base.

6. The pet restraint device as claimed in claim 1 further comprising:
the support base further comprising a first base surface and a second base surface;
the first base surface being positioned opposite to the second base surface across the support base;
the first strap end of the proximal restraining strap, the first strap end of the at least one intermediate restraining strap, and the first strap end of the distal restraining strap being each connected to the second base surface, adjacent to the first lengthwise edge; and
the second strap end of the proximal restraining strap, the second strap end of the at least one intermediate restraining strap, and the second strap end of the distal restraining strap being each connected to the second base surface, adjacent to the second lengthwise edge.

7. A pet restraint device comprising:
a support base;
a proximal restraining strap;
a distal restraining strap;
a plurality of intermediate restraining straps;
a chest restraining band;
a rear restraining band;
the support base comprising a first lengthwise edge, a second lengthwise edge, a first widthwise edge, and a second widthwise edge;
the proximal restraining strap, the plurality of intermediate restraining straps, and the distal restraining strap each comprising a first strap end and a second strap end;
the proximal restraining strap, the plurality of intermediate restraining straps, and the distal restraining strap being distributed along the support base;
the proximal restraining strap being positioned adjacent to the first widthwise edge;
the distal restraining strap being positioned adjacent to the second widthwise edge;
the plurality of intermediate restraining straps being distributed along the support base;
the plurality of intermediate restraining straps being positioned in between the proximal restraining strap and the distal restraining strap;
the first strap end of the proximal restraining strap, each first strap end of the plurality of intermediate restraining straps, and the first strap end of the distal restraining strap being each mounted onto the support base, adjacent to the first lengthwise edge;
the second strap end of the proximal restraining strap, each second strap end of the plurality of intermediate restraining straps, and the second strap end of the distal restraining strap being each mounted onto the support base, adjacent to the second lengthwise edge;
the chest restraining band and the rear restraining band each comprising a band body, a first band end, a second band end, a first band loop, and a second band loop;
the first band end being positioned opposite to the second band end along the band body;
the first band loop being terminally integrated into the first band end;
the second band loop being terminally integrated into the second band end;
the first band loop being positioned adjacent to the first lengthwise edge;
the second band loop being positioned adjacent to the second lengthwise edge;
the proximal restraining strap being slidably engaged through the first band loop and the second band loop of the chest restraining band; and
the distal restraining strap being slidably engaged through the first band loop and the second band loop of the rear restraining band.

8. The pet restraint device as claimed in claim 7 further comprising:
the support base being a rectangular base;
the first lengthwise edge being positioned parallel and opposite to the second lengthwise edge across the support base;
the first widthwise edge being positioned parallel and opposite to the second widthwise edge across the support base;
the first lengthwise edge being positioned perpendicular to the first widthwise edge; and
the proximal restraining strap, the at least one intermediate restraining strap, and the distal restraining strap being positioned parallel to each other.

9. The pet restraint device as claimed in claim 7 further comprising:
the proximal restraining strap, the at least one intermediate restraining strap, and the distal restraining strap each further comprising a first strap member, a second strap member, a strap eyelet, and a strap fastener;

the first strap member being positioned coincident to the first strap end;

the second strap member being positioned coincident to the second strap end;

the strap eyelet being terminally connected to the first strap member, offset from the first strap end;

the strap fastener being mounted onto the second strap member, offset from the second strap end;

the second strap member being looped through the strap eyelet, offset from the second strap end; and the strap fastener being attached onto the second strap member, adjacent to the second strap end.

10. The pet restraint device as claimed in claim 7 further comprising:

the support base further comprising a first base surface and a second base surface;

the first base surface being positioned opposite to the second base surface across the support base;

the first strap end of the proximal restraining strap, the first strap end of the at least one intermediate restraining strap, and the first strap end of the distal restraining strap being each connected to the second base surface, adjacent to the first lengthwise edge; and the second strap end of the proximal restraining strap, the second strap end of the at least one intermediate restraining strap, and the second strap end of the distal restraining strap being each connected to the second base surface, adjacent to the second lengthwise edge.

* * * * *